Oct. 6, 1953     F. D. SAWYER     2,654,303
TRACTOR LINK
Filed Sept. 24, 1951
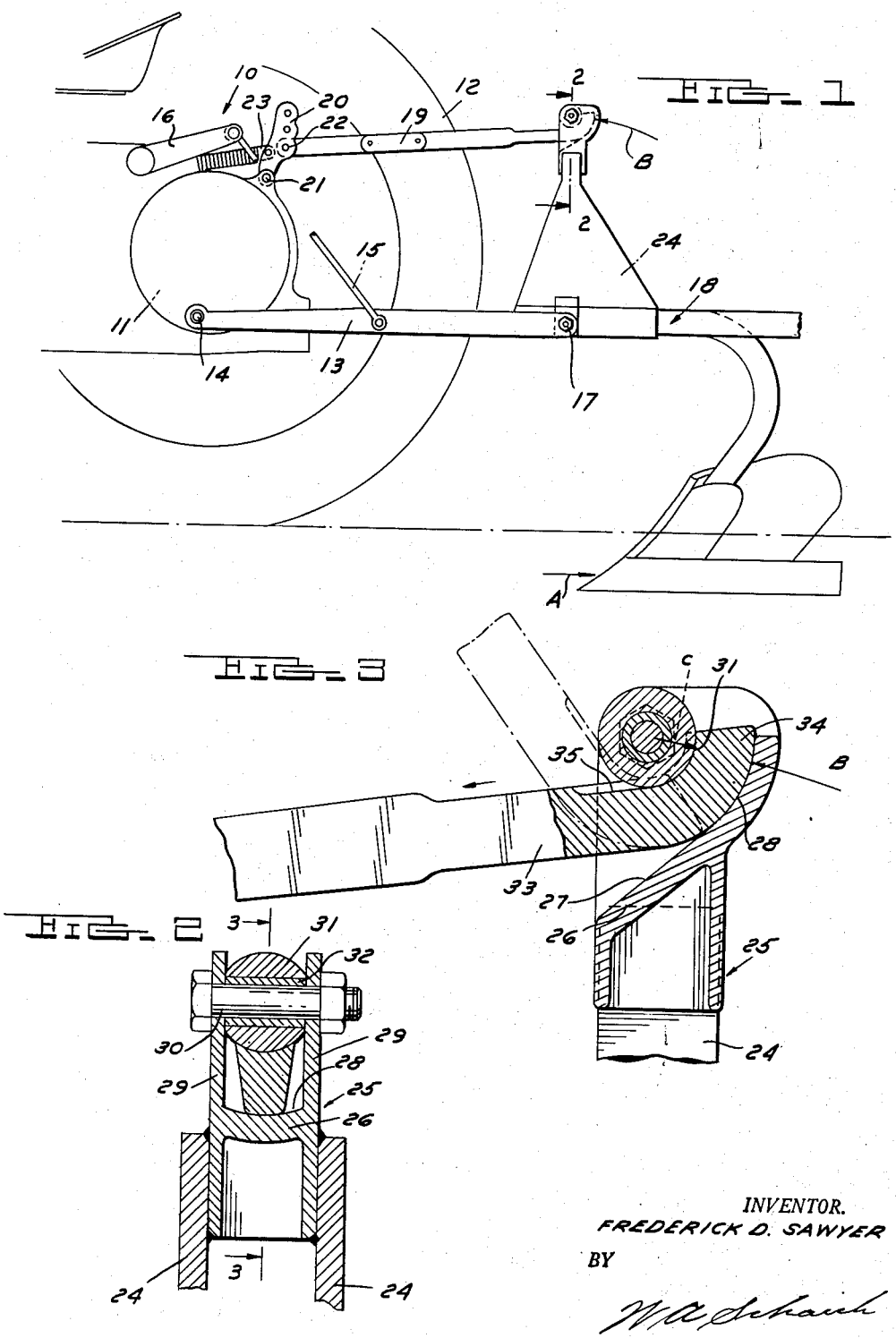
INVENTOR.
FREDERICK D. SAWYER
BY
*W. A. Schaich*
ATTORNEY Patented Oct. 6, 1953

2,654,303

UNITED STATES PATENT OFFICE 2,654,303

TRACTOR LINK

Frederick D. Sawyer, Wayne, Mich., assignor to Dearborn Motors Corporation, Birmingham, Mich., a corporation of Delaware Application September 24, 1951, Serial No. 248,057

7 Claims. (Cl. 97—47.62)

The present invention relates to an improved tractor-implement link connection and more particularly to a quickly attachable and detachable link arrangement forming a portion of a three-point lift-type implement linkage.

The conventional three-point lift-type tractor-implement linkage, as in the well-known Ford tractor system, includes a pair of laterally spaced power-liftable lower hitch links and an upper link forming a connection between the tractor and the implement "A" frame above and laterally intermediate the lower links. The conventional link-implement connection utilizes a pivot pin manually insertable through a centrally bored spherical bearing in the rear end of the link and through laterally spaced apertures in the "A" frame registering with the bearing bore. The insertion of the pivot pin requires demounting the tractor, aligning the bearing bore with the "A" frame apertures, and finally manually maneuvering the pivot pin through the space thus provided.

The present invention now provides an improved tractor-implement link connection wherein the top link may be secured to the implement by merely inserting the same between spaced bearing surfaces with the link being retained in its inserted position by forces acting upon the link during working of the implement and also during implement transport. More particularly, the connection of the present invention includes means on the implement defining a pair of spaced, concentrically curved bearing surfaces, and a top link having an end portion insertable between the bearing surfaces into conformity therewith. Since the link is normally subjected to only compressive forces when the implement is in working position, and only to tension forces when the implement is in transport position, it is not necessary to provide a rigid link-implement connection, nor is it necessary to utilize an extraneous fastening means.

It is, therefore, an important object to provide an improved link-implement connection requiring no extraneous fastening means.

Another important object of the present invention is the provision of means for securing a link to an implement by merely inserting a portion of the link between spaced bearing surfaces provided on the implement.

It is a further object to provide a link having an end portion insertable between spaced retaining surfaces so as to be retained between the surfaces by the forces normally acting upon the link during implement operation.

Still another important object is the provision of an implement-link connection wherein a link is provided with a curved end portion insertable between correspondingly curved bearing surfaces on an implement so as to be retained therebetween by compressive forces exerted on the link during working of the implement and by tension forces exerted upon the link during transporting of the implement.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a fragmentary side elevational view of a tractor having one wheel removed and provided with a link connection of the present invention for connecting the tractor to an implement;

Figure 2 is a fragmentary sectional view, with parts shown in elevation, taken along the plane 2—2 of Figure 1;

Figure 3 is a fragmentary elevational view taken along the plane 3—3 of Figure 2.

As shown on the drawings:

In Figure 1, reference numeral 10 refers generally to a tractor, such as the Ford tractor, having a rear axle housing 11 extending between the tractor rear wheels 12 and carrying rearwardly extending draft links 13 pivotally attached, as at 14, to the rear axle housing. The draft links 13 are power-liftable through lift arms 15 pivoted to the links 13 intermediate their length and extending upwardly therefrom to power actuated rock arms 16 operably connected to the tractor hydraulic system. The freely extending rear ends of the links 13 are pivotally attached, as at 17, to a cross shaft (not shown) of an implement, such as a plow indicated generally at 18.

The tractor is also connected to the implement 18 through a rearwardly extending top link 19 located above and laterally intermediate the lower links 13. The tractor top link connection includes an upstanding control arm 20 pivoted at 21 to the tractor rear axle housing and detachably pivoted at 22 to the forward end of the link 19. The arm 20 is also pivotally connected to a tractor hydraulic system control arm 23, so that pivoting movement of the arm 20 about its pivot point 21 is reflected upon the hydraulic system to control elevation of the draft links 13, as is well-known in the art.

The implement 18 is provided with an upstanding "A" frame comprising a pair of upwardly converging side plates 24 rigidly attached to the implement 18 and provided at their upper ends with a link mounting means 25, as best shown in Figures 2 and 3. The link mounting means includes a casting having an interior wall 26 having a rearwardly and upwardly sloping front surface 27 terminating in a segmental spherical bearing surface 28 at the uppermost portion thereof. The central wall 26 serves to join a pair of upwardly projecting side webs 29 receiving therethrough a mounting bolt and nut 30 which serve to retain a spherical bearing 31 axially apertured to receive a sleeve 32 therethrough which in turn receives the bolt 30.

It will be noted that the exterior of the bearing 31 and the bearing surface 28 are concentric, and the spaced segmental spherical bearing surfaces provided thereby may be entered beneath the bearing element 31 by virtue of the downwardly and forwardly inclined surface 27. The upper link 19 is provided with a reduced rear end portion 33 which terminates in an upwardly deflected terminal lip 34 enterable between the bearing surfaces 28 and 31. The top link lip 34 is provided with an upper uniformly recessed surface 35 concentric with and adapted to snugly mate the exterior of the bearing 31, while the outer surface of the end portion 34 is also concentric with and adapted to mate the surface 28.

It will be seen that the link end portion 34 may be readily inserted between the surfaces 28 and 31 by merely elevating the forward end of the link 19, as indicated in dotted outline in Figure 3 and slipping the end between the bearing surfaces, followed by depression of the link forward end, so that the pivot pin 22 may be inserted through the link forward end and the registering apertures in the control arm 20.

As hereinbefore discussed, when the implement 18 is in working position, as indicated in Figure 1, resistance to forward movement of the implement and the tractor will be centered at the ground engaging portions of the implement, as denoted by the directional arrow A. This resistance to movement, if unopposed, would result in rotation of the implement about the pivot points 17 forming the connection of the draft links 13 to the implement. This attempted rotational movement is denoted by directional arrow B of Figure 1. Since the top link 19 resists rotation of the implement about the pivot point 17, the link is under compression at all times when the implement is in ground working position. This compressive force will be exerted upon the link terminal end 34 through the bearing surface 28, and it will be seen that this force aids in retaining the link end in its position between the surfaces 28 and 31.

When the links 13 are elevated by actuation of the rock arms 16, so that the implement 18 is raised to a transport position, the implement will tend to rotate in the opposite direction about the pivot point 17, so that the link is placed under tension by the force represented diagrammatically at C (Figure 3), the force being exerted upon the link end 34 by the bearing surface 31. It will be seen that this force will only serve to wedge the link end 34 more tightly against the bearing surface 28 and once again the link will not be displaced from its illustrated position.

Therefore, the present invention provides an implement-top link connection wherein a link end may be inserted between concentric bearing surfaces formed on the implement by manipulation of the link from the tractor seat and without the necessity of utilizing extraneous fastening means. The link end is secured to the implement against displacement by either compressive or tension forces acting thereon during utilization of the implement. The spherical bearing surfaces of the link and the implement attaching point prevent interference of the top link connection with freedom of lateral movement and of vertical movement into and out of working position.

The hook-like projection 34 on the rear end of the link 33 is retained in engagement with the implement 18 throughout the normal range of angular movement of the link 33 relative to the "A" frame, i. e., from the lowered working position of the implement to the raised implement transport position, by the forces exerted on the link. However, if the link is angularly moved beyond this normal range of movement, for example, upwardly, the link is removable from operative position by removal of the projection 34 from its position between the bearing surfaces of the implement. Therefore, the connection remains established throughout the normal range of angular movement, but the connection is disestablishable at will by abnormal movement of the link beyond this range.

It will, of course, be understood that various details of construction may be varied through a wide range without departing from the principles of this invention, and it is, therefore, not the purpose to limit the patent granted hereon otherwise than necessitated by the scope of the appended claims.

I claim:

1. A top link connection comprising a spherical bearing on an implement "A" frame, a bearing housing having an inner bearing surface radially spaced from and concentric with said bearing, and a top link having a free curved end enterable between and snugly mating with said bearing and said bearing surface.

2. A tractor link connection comprising receiving means having spaced concentrically curved segmental spherical bearing surfaces, and a link having an end portion enterable between said bearing surfaces and provided with segmental spherical surfaces concentric with said bearing surfaces and adapted for snugly mating engagement therewith.

3. In a tractor-implement combination wherein the implement tends to rotate in a vertical plane about its point of attachment to the tractor, a link connection comprising concentric spaced bearing surfaces on the implement vertically displaced from said point of attachment, and a link projecting from said tractor toward said implement and having a free end portion enterable between said bearing surfaces into snug engagement therewith, said link opposing the tendency of said implement to rotate with forces exerted on said link by virtue of such tendency retaining said free end portion in position between said surfaces.

4. In a tractor-implement linkage including a pair of lower laterally spaced draft links having opposing ends respectively pivoted to the tractor and the implement, a top link connection comprising means on the implement defining spaced concentric segmental spherical bearing surfaces above the points of attachment of said lower links with one of said surfaces being interposed between the other of said surfaces and said tractor, and a top link having one end pivoted to said tractor and the other end snugly interposed between said bearing surfaces, those surfaces of said link contacting said bearing surfaces being concentric therewith and of mating segmental spherical contour.

5. In a linkage for attaching an implement "A" frame to a pair of power-liftable draft links having limited freedom of lateral movement, means for imparting vertical stability to the linkage while accommodating vertical and lateral movement thereof comprising a top link having its forward end pivoted to the tractor and its rear end projecting therefrom, said link rear end having concentric opposing concave and convex forward and rear faces respectively, a spherical attachment bearing carried by said "A" frame and snugly seated against the concave forward face of said link, and means on said "A" frame defining a concave surface snugly receiving said convex rear face of said link thereagainst, said bearing, said concave surface, and said link faces being concentric to accommodate relative movement therebetween without binding.

6. Means for connecting a tractive device to a trailing device movable in a vertical plane relative to the tractive device, said means comprising a link having one end pivotally secured to one of said devices and having an arcuate hook-like projection at the other end thereof engageable with a similarly arcuate portion of the other of said devices, said link and said other device being retained in engagement by forces exerted thereon despite vertical movement of said trailing device so long as said projection is in engagement with said arcuate portion, and said projection being removable from said other device by angular movement of said link from engagement with the said arcuate portion.

7. Means for connecting a tractive device to a trailing device movable in a vertical plane relative to the tractive device, said means comprising a pin mounted on one of said devices, means on said one device cooperating with said pin to define an arcuately extending socket concentric about the axis of said pin, a link having means on one end thereof for pivotal attachment to the other of said devices, a hook shaped element formed on the other end of said link shaped to snugly conform to said socket, said socket having an opening permitting the insertion of said hook shaped element only in an angular position of said link relative to said one device substantially displaced from the positions normally assumed by said link when interconnecting said devices.

FREDERICK D. SAWYER.

References Cited in the file of this patent
UNITED STATES PATENTS

| Number | Name | Date |
|---|---|---|
| 684,732 | Villard | Oct. 15, 1901 |
| 1,888,966 | Babcock | Nov. 22, 1932 |
| 2,223,002 | Ferguson | Nov. 26, 1940 |